United States Patent [19]

Ito

[11] Patent Number: 4,736,228
[45] Date of Patent: Apr. 5, 1988

[54] NEGATIVE FILM CARRIER UNIT ASSEMBLY

[75] Inventor: Morio Ito, Arita, Japan

[73] Assignee: Noritsu Kenkyu Center Co., Ltd., Wakayama, Japan

[21] Appl. No.: 42,099

[22] Filed: Apr. 23, 1987

[30] Foreign Application Priority Data

Apr. 25, 1986 [JP] Japan .................................. 61-63840
Apr. 28, 1986 [JP] Japan .................................. 61-64640
Apr. 28, 1986 [JP] Japan .................................. 61-64641

[51] Int. Cl.⁴ ............................................. G03B 27/62
[52] U.S. Cl. ..................................................... 355/75
[58] Field of Search ...................... 355/75, 76; 352/226

[56] References Cited

U.S. PATENT DOCUMENTS

| | | | |
|---|---|---|---|
| 3,397,613 | 8/1968 | Kallenberg | 355/75 |
| 3,511,565 | 5/1970 | Harman, Jr. et al. | 355/75 X |
| 4,161,365 | 7/1979 | Anderson et al. | 355/75 |
| 4,252,436 | 2/1981 | Kogane | 355/75 |
| 4,396,281 | 8/1983 | Okabe et al. | 355/76 X |
| 4,497,574 | 2/1985 | Tarsia et al. | 355/76 |
| 4,545,674 | 10/1985 | Ishitate et al. | 355/75 |

Primary Examiner—Richard A. Wintercorn
Attorney, Agent, or Firm—Wenderoth, Lind & Ponack

[57] ABSTRACT

An improved negative film carrier unit assembly for use with a photographic printer is proposed which comprises a negative film carrier unit having a negative film mask for holding a negative film and a negative film presser member for pressing a negative film in a film guide groove in the negative film mask, and a negative film mask base for supporting the negative film carrier unit. The negative film mask base is provided on its upper surface with a fixed projection and a movable rejection which are adapted to be received in recesses formed in the bottom surface of the negative film mask.

3 Claims, 2 Drawing Sheets

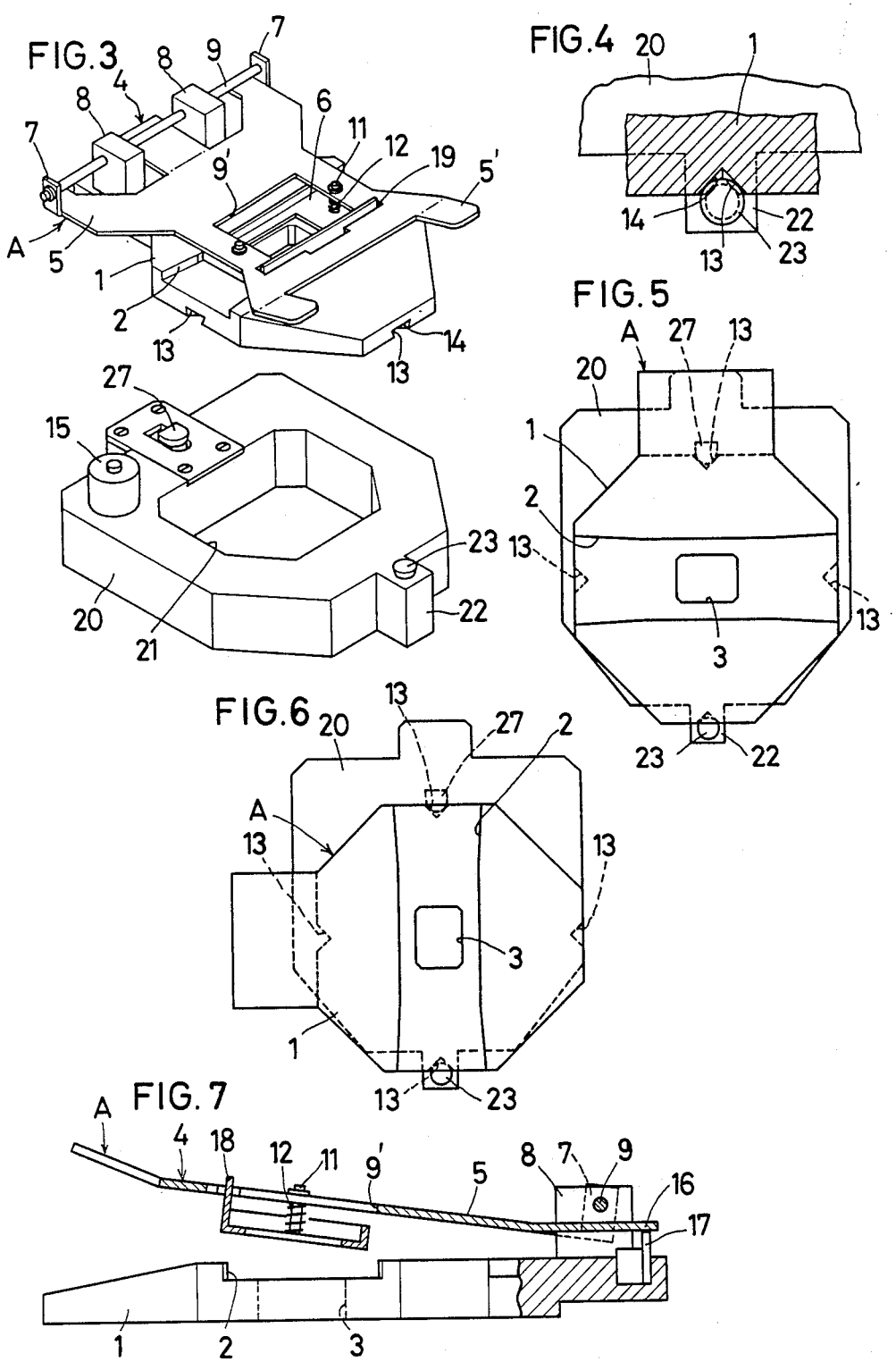

NEGATIVE FILM CARRIER UNIT ASSEMBLY

The present invention relates to a negative film carrier unit assembly for use with a photographic printer.

With a photographic printer in which a negative film set between a light source and a lens is irradiated by the light to print an image projected through the lens on a printing paper for enlargement, the negative film is exposed to light, supported on a negative film carrier unit.

Describing the negative film carrier unit with reference to FIGS. 1-3, it comprises a negative film mask 1 formed with a film guide groove 2 in its upper surface and with an aperture 3 in the bottom surface of the film guide groove 2, and a negative film presser member 4 for pressing a negative film in the film guide groove 2.

The negative film presser member 4 comprises a negative film presser arm 5 and a negative film presser frame 6 arranged under the negative film presser arm. The negative film presser arm 5 is formed at its both sides with a pair of protruding portions 7 pivotally mounted on a shaft 9 supported by a pair of supports 8 protruding from the upper surface of the negative film mask 1 at its rear. The negative film presser arm 5 is formed therein with a hole 9' at a position opposite to the aperture 3 in the negative film mask 1. A pair of pin holes 10 are formed at both sides of the hole 9' to receive a respective pin 11 provided on the upper surface of the negative film presser frame 6 at each side and provided with a nut. Each pin 11 is provided with a spring 12 therearound to press down the presser frame 6.

The negative film presser arm 5 of the negative film carrier unit A is pivoted downwardly to elastically press the negative film F in the film guide groove 2 by means of the presser frame 6. The negative film being pressed is exposed to light. The negative film presser arm 5 is then swung upwardly to remove the pressure on the negative film and allow it to be fed forward frame by frame.

Among such negative films, some have to be advanced in the longitudinal direction of the carrier apparatus and the other have to be advanced in the transverse direction, depending on the kind of the negative films. Therefore, the negative film carrier unit has to be so adapted that the direction of the film guide groove 2 is changeable.

Heretofore, the negative film carrier unit has been mounted on a turntable so as to change the direction of the film guide groove by rotating the turntable. The turntable has to be rotatably supported and provided with a driving means for rotating it as well as with a mechanism for retaining the turntable in the position where the rotation stops. Such a support means is very complicated in construction and time-consuming to assemble.

An object of the present invention is to provide a negative film carrier unit assembly having a simple construction, which obviates the abovesaid shortcomings and which allows to change the direction of feed of a negative film without any trouble.

Another object of the present invention is to provide a negative film carrier unit assembly which permits the negative film presser arm to be held in its pivoted position.

A further object of the present invention is to provide a negative film carrier unit assembly which allows a negative film to be set in position in a film guide groove formed in the negative film mask without failure.

In accordance with the present invention, the negative film mask base is provided on its upper surface with a fixed projection and with a projection movable toward and away from said fixed projection and urged by a spring. The negative film mask is provided in its bottom surface at its front and rear ends as well as at its both sides with recesses for receiving the fixed and movable projections.

The movable projection is engaged in one of the four recesses formed in the bottom of the negative film mask to place the negative film mask in position on the negative film mask base. The negative film mask is then pushed to this side to engage the fixed projection in the front recess. Thus the negative film carrier unit can be fixedly mounted in position on the negative film mask base with ease. Further, since the direction of the negative film mask can be changed by 90 degrees to change the direction of a film guide groove, the direction of feed of a negative film can be readily changed.

Since the fixed projection and the movable projection are engaged in four recesses, the negative film carrier unit can be mounted on the negative film mask base in a predetermined position with accuracy and in a stable manner. The construction is so simple in that the fixed projection and the movable projection are formed on a negative film mask base, that the recesses are formed in the outer periphery of a negative film mask, and that it is easy and inexpensive to make.

Other features and objects of the present invention will become apparent from the following description taken with reference to the accompanying drawings, in which:

FIG. 3 is an exploded perspective view of the negative film carrier unit and the negative film mask base of the same;

FIG. 4 is a plan view showing how the fixed projection engages in the recess;

FIG. 5 is a plan view showing how a negative film mask is supported on the negative film mask base when a negative film is fed transversely;

FIG. 6 is a plan view similar to FIG. 5 in which a negative film is fed longitudinally; and FIG. 7 is a sectional view of the negative film carrier unit with its negative film presser arm raised.

Figure 2:
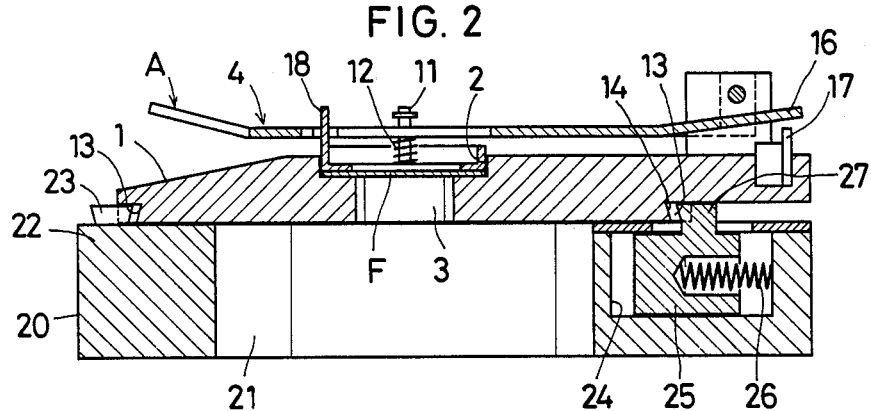
FIG. 2 is a sectional view taken along line II—II of FIG. 1.

First, referring to FIGS. 2 and 3, a negative film mask base 20 is formed with a square hole 21, a protruding portion 22 at its front center, a fixed projection 23 on the upper surface of the protruding portion 22. The negative film mask base 20 is also formed in its upper rear surface with an elongated guide groove 24 extending toward the fixed projection 23. A slider 25 and a spring 26 serving to urge the slider 25 toward the fixed projection 23 are received in the guide groove 24.

On the upper surface of the slider 25 is formed a movable projection 27. The movable projection 27 and the fixed projection 23 are in the form of taper pins.

A negative film carrier unit A is adapted to be placed on a negative film mask base 20. The negative film mask 1 is square and is formed with a film guide groove 2 in its upper surface. The film guide groove 2 is open at both sides of the negative film mask 1. The negative film mask 1 is formed with four V-shaped recesses 13 to receive the fixed projection 23 and the movable projection 27 in its bottom at both front and rear ends and at each side. As shown in FIGS. 2 and 4, each recess 13 is tapered on both sides 14 so as to correspond to the outer periphery of the fixed projection 23 and the movable projection 27.

In order to set the negative film mask 1 on the negative film mask base 20, one of the four recesses 13 is put in engagement with the movable projection 27 and then the negative film mask 1 is pushed back so as to move the slider 25 back against the bias of the spring 26. Then the slider 25 and the negative film mask 1 interlocked together through the movable projection 27 are moved forward by the bias of the spring 26 or by hand for engaging the fixed projection 23 in the recess 13 on the side of the fixed projection 23. Now, the negative film carrier unit A has been mounted on the negative film mask 20.

As shown in FIG. 5, if the fixed projection 23 and the movable projection 27 are engaged in the recesses 13 formed in the bottom surface of the negative film mask 1 at its front and rear ends, the film guide groove 2 in the upper surface of the negative film mask 1 will be arranged so as to extend in the transverse direction so that a negative film F is fed transversely. As shown in FIG. 6, if the fixed projection 23 and movable projection 27 are engaged in the recesses 13 formed in the bottom surface of the negative film mask 1 at both sides, the film guide groove 2 will be arranged to extend in the longitudinal direction of the negative film carrier assembly so as to allow the negative film F to be fed longitudinally.

In mounting the negative film carrier unit A, the negative film mask 1 can be mounted on the negative film mask base 20 in a predetermined position with accuracy thanks to the fixed projection 23. Further, since the fixed projection 23 and movable projection 27 are engaged in the recesses 13, the negative film mask 1 will neither move longitudinally nor transversely. Also the negative film mask 1 is hindered from moving upwardly since the tapered peripheries of the fixed projection 23 and the movable projection 27 engage the tapered surfaces on both sides of the recesses 13.

When it is desired to change the direction of the film guide groove 2, the negative film mask 1 is dismounted from the negative film mask base 20 and turned by 90 degrees.

Though, in this embodiment, the fixed projection 23 and movable projection 27 take the shapes of taper pins and the recesses 13 for engagement are V-shaped, any other shape may be adopted.

Figure 1:
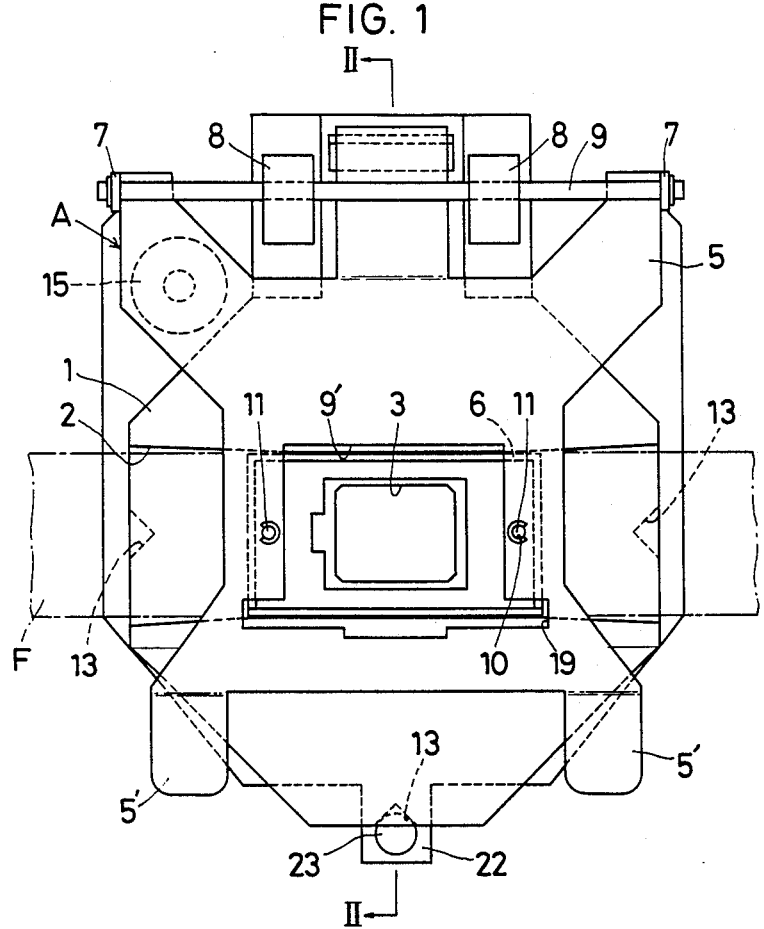
FIG. 1 is a plan view of a negative film carrier unit assembly in accordance with the present invention.

As shown in FIGS. 1 and 3, the negative film mask base 20 is provided on its upper rear surface with a solenoid 15, which is adapted to attract the negative film presser arm 5 to hold it in the lowered position when the negative film presser member 4 is lowered to press the negative film F in the film guide groove 2.

As shown in FIG. 7, the negative film presser arm 5 is provided at its rear end with an attracted piece 16 adapted to be attracted by a magnet 17 provided on the upper surface of the negative film mask 1. The magnet 17 is adapted to attract the piece 16, when the end portion of the negative film presser arm 5 is raised to turn the arm upwardly and hold it in the raised position. In this state, the negative film F can be set on the film guide surface 2 and fed forward.

In FIG. 1, the front plate of the negative film presser frame 6 on the side of insertion of the negative film is in the shape of a block plate 18 which extends through the hole 9' so as to close the space between the negative film presser frame 6 and the negative film presser arm 5. The number and width of the block plate or plates may be freely selected. If the width of the block plate 18 is the same as that of the negative film presser frame 6, the hole 9' in the negative film presser arm 5 has to be formed at its front with a wide portion 19 (FIG. 3) for inserting the block plate 18. Or else the negative film presser arm may be integrally provided with a pair of protruding portions at both sides of the hole 9' so as to form a pin hole 10 in each of the protruding portions.

The negative film presser frame 6 can be drawn out of the film guide groove 2 by raising handle plates 5' of the negative film presser arm 5 so as to pivotally turn the negative film presser arm 5 upwardly about the pin 9 to raise the negative film presser frame 6 together with the negative film presser arm 5. In this state, the negative film F can be inserted between the negative film mask 1 and the negative film presser frame 6 from the front side of the negative film mask 1 and set in the film guide groove 2. Since the space between the negative film presser arm 5 and the negative film presser frame 6 is closed by the block plate 18, the negative film F can be set in the film guide groove 2 with accuracy, eliminating the possibility of inserting the negative film into a wrong position by error. After inserting the negative film F, the negative film presser arm 5 is turned downwardly to press the negative film F against the film guide groove 2 by means of the negative film presser frame 6.

The negative film carrier unit assembly according to the present invention is used for a photographic printer in which the light for printing is irradiated perpendicularly. The same assembly can be used for a photographic printer in which the light is irradiated horizontally.

What are claimed are:

1. In a negative film carrier unit assembly for use with a photographic printer comprising a negative film carrier unit having a negative film mask formed with a film guide groove in its upper surface and a negative film presser member pivotally movably supported on said negative film mask for pressing a negative film placed in said film guide groove, and a negative film mask base for supporting said negative film carrier unit, the improvement wherein said negative film mask base is provided on its upper surface with a fixed projection and with a projection movable toward and away from said fixed projection, a spring for urging said movable projection toward said fixed projection, said negative film mask being provided in its bottom surface at the front and rear ends as well as at both sides with recesses for receiving said fixed and movable projections.

2. A negative carrier unit assembly for a photographic printer as claimed in claim 1, wherein said fixed and movable projections are in the shape of taper pins, each of said recesses being V-shaped having its both sides tapered so as to correspond to the tapered surfaces on said fixed and movable projections.

3. A negative film carrier unit assembly as claimed in claim 1, wherein said negative film mask is provided with a magnet on upper surface thereof to hold one end of said negative film presser member.

* * * * *

UNITED STATES PATENT AND TRADEMARK OFFICE
CERTIFICATE OF CORRECTION

PATENT NO. : 4,736,228

DATED : April 5, 1988

INVENTOR(S) : Morio ITOU

It is certified that error appears in the above-identified patent and that said Letters Patent is hereby corrected as shown below:

In the heading of the patent, line [75], for "Ito", read --ITOU--.

Signed and Sealed this

Twenty-eighth Day of February, 1989

*Attest:*

DONALD J. QUIGG

*Attesting Officer*    *Commissioner of Patents and Trademarks*